(12) United States Patent
Baek (10) Patent No.: US 9,626,260 B2
(45) Date of Patent: Apr. 18, 2017

(54) READ/WRITE CACHE DEVICE AND METHOD PERSISTENT IN THE EVENT OF A POWER FAILURE

(71) Applicant: Jungwon University Industry Academy Cooperation Corps., Goesan-gun, Chungcheongbuk-do (KR)

(72) Inventor: Sung Hoon Baek, Chungcheongbuk-do (KR)

(73) Assignee: JUNGWON UNIVERSITY INDUSTRY ACADEMY COOPERATION CORPS., Goesan-gun, Chungcheongbuk-do (KR)

( * ) Notice: Subject to any disclaimer, the term of this patent is extended or adjusted under 35 U.S.C. 154(b) by 14 days.

(21) Appl. No.: 14/723,539

(22) Filed: May 28, 2015

(65) Prior Publication Data

US 2015/0347247 A1    Dec. 3, 2015

(30) Foreign Application Priority Data

Jun. 3, 2014 (KR) ........................ 10-2014-0067327

(51) Int. Cl.
| | |
|---|---|
| *G06F 11/00* | (2006.01) |
| *G06F 11/20* | (2006.01) |
| *G06F 12/0891* | (2016.01) |
| *G06F 11/14* | (2006.01) |

(52) U.S. Cl.
CPC ...... *G06F 11/2017* (2013.01); *G06F 11/1435* (2013.01); *G06F 11/1441* (2013.01); *G06F 12/0891* (2013.01); *G06F 11/1471* (2013.01); *G06F 2201/82* (2013.01); *G06F 2201/885* (2013.01); *G06F 2212/1008* (2013.01); *G06F 2212/1032* (2013.01)

(58) Field of Classification Search
USPC .......................................................... 714/15
See application file for complete search history.

(56) References Cited

U.S. PATENT DOCUMENTS

| | | | |
|---|---|---|---|
| 2011/0197036 A1* | 8/2011 | Ishii ..................... | G06F 12/0866 711/155 |
| 2013/0067163 A1* | 3/2013 | Velayudhan ............ | G06F 13/12 711/114 |

FOREIGN PATENT DOCUMENTS

| | | |
|---|---|---|
| KR | 10-2010-0092590 A | 8/2010 |
| KR | 10-2014-0053309 A | 5/2014 |

* cited by examiner

*Primary Examiner* — Sarai Butler
(74) *Attorney, Agent, or Firm* — Paratus Law Group, PLLC (57) ABSTRACT

A read/write cache device and method persistent in the event of a power failure are disclosed herein. The read/write cache device includes a meta-information part, a recency/frequency (RF) table part, a mapping table part, and a log area. The meta-information part provides information about whether metadata has integrity and information about the version of metadata stored in two metadata regions. The RF table part provides information about the recency and frequency of each of low-speed segments of a plurality of high-speed and low-speed segments and information about whether each of the low-speed segments is cached, in order to maintain the consistency of the metadata. The mapping table part provides information about a low-speed segment that is cached to each of the high-speed segments. The log area provides changed caching information that is not applied into the mapping table part.

15 Claims, 7 Drawing Sheets

READ/WRITE CACHE DEVICE AND METHOD PERSISTENT IN THE EVENT OF A POWER FAILURE

CROSS REFERENCE TO PRIOR APPLICATION

This application claims priority to Korean Patent Application No. 10-2014-0067327 (filed on Jun. 3, 2014), which is hereby incorporated by reference in its entirety.

BACKGROUND

1. Technical Field

The present invention relates generally to a read/write cache device and method that are persistent in the event of a power failure and, more particularly, to a read/write cache device and method that are persistent in the event of a power failure, which are capable of, in a hybrid storage system that consists of a high-speed storage device and a low-speed storage device, improving read/write performance using the high-speed storage device as a cache device, retaining data even when a power failure occurs, and exhibiting a low overhead with general high-speed storages that are available in the market.

2. Description of the Related Art

Generally, in the fields in which computers are employed, a storage system is one of the important components that are capable of retaining data.

Recently, storage devices having new structures completely different from those of hard disk drives (HDDs), i.e., semiconductor storage devices such as solid state drives (SSDs) composed of semiconductors, have emerged and developed. Such semiconductor storage devices are more expensive than HDDs, but have processing speeds that are several hundreds of times faster than those of HDDs.

Although a storage device including only SSDs has very high performance, it has smaller capacity than an HDD. In contrast, although a traditional storage device based on an HDD has high capacity relative to its cost, it has very low performance. Accordingly, many efforts have been made to construct a single virtual storage device by combining an SSD and an HDD.

In general, all data used in a computer is stored in a low-speed storage device (i.e., an HDD), but frequently used data is cached in a high-speed storage device (i.e., an SSD). However, the high-speed storage device is used as only a read cache due to a data consistency problem that occurs in the event of a power failure. That is, when a write request for a cached region of the high-speed storage device is delivered, the cached region needs to be evicted from the high-speed storage device. Accordingly, traditional technologies exhibit high performance for read-oriented workloads, but low performance for write-oriented workloads.

A write cache refers to a cache that can support the consistency of cached data even after a crash or power failure and can retain dirty data in the high-speed storage device. However, a write cache that consists of common storage devices has not yet been proposed due to performance degradation and a data consistency problem.

A write cache needs to consistently store the cache metadata in a nonvolatile storage device along with cached data, but performance degradation in the write cache is significant because the cache metadata must be updated whenever cache information changes. An embodiment of the present invention proposes a high-performance write cache that can ignore the overhead of a write cache. The write cache may provide twice performance improvement of a read-only cache.

The write cache must guarantee the consistency of cached data and cache metadata even after a power failure so that the cached data can be used immediately after a system has started.

In an embodiment of the present invention, the overhead to consistently maintain the cache metadata is very small. In particular, the present invention learns and analyzes I/O accesses for a long period of time. Updating the cache content is periodical performance during idle time after long-term learning. In connection with a desktop workload, a periodic cache update method according to an embodiment of the present invention may decrease the hit rate in comparison with on-demand cache replacement policies. However, on-demand cache replacement policies consume a considerable portion of the high-speed storage device.

In accordance with an embodiment of the present invention, to solve the consistency problem of a persistent write cache, a special device is not used, bat a known high-speed storage device that can be easily purchased in the market is used.

Furthermore, recency and frequency are taken into consideration. Recently or frequently used data may be cached. If data has not been recently used, the data is not cached even if the data is frequently used. Although many traditional cache replacement policies that consider both recency and frequency have been proposed, they cannot be used in a write cache that is persistent when a power failure occurs because they have been designed for volatile memory. Accordingly, the structure of the present invention is significantly different from traditional cache policies.

In particular, the present invention provides a read/write cache method that persistently and consistently manages its data and metadata, and guarantees no data loss even after a crash.

RELATED ART DOCUMENT

Patent Document

Korean Patent Application Publication No. 2014-0053309 (published on May 7, 2014)

SUMMARY

Accordingly, the present invention has been made keeping in mind the above problems occurring in the prior art, and an object of the present invention is to provide a read/write cache device and method persistent in the event of a power failure, which are capable of, in a hybrid storage system that consists of a high-speed storage device and a low-speed storage device, improving read/write performance using the high-speed storage device as a cache device.

Furthermore, another object of the present invention is to rapidly provide a read/write request for frequently used data because the frequently used data is redirected to the read/write cache in the high-speed storage device.

Furthermore, yet another object of the present invention is to provide a fully persistent read/write cache, which improves both read and write performance, does not require any special primitive, has a low overhead, guarantees the integrity of the cache metadata and the consistency of the cached data, even during a crash or power failure, and is able to recover the flash cache quickly without any data loss.

In accordance with an aspect of the present invention, there is provided a read/write cache device persistent in the event of a power failure, including: a meta-information part configured to provide information about whether metadata has integrity and information about a version of the main metadata stored in two metadata regions; an recency/frequency (RF) table part configured to provide the RF value for each low-speed segment to determine the low-speed segment is recently and frequently accessed; a mapping table part configured to provide which low-speed segment each high-speed segment caches; and a log area configured to provide caching information that is not applied to the mapping table part.

The meta-information part may comprise: an ID configured such that ID information indicating whether metadata stored in the metadata region is valid; a version configured to indicate one of the two metadata regions in which latest metadata has been stored; and a hash used to check whether metadata has integrity if the read/write cache device is incompletely stopped while the metadata is being stored.

The RF table part may include a number of RF items that are equal to the number of the low-speed segments.

Each of the RF items may include: an RF value configured to indicate how recently and frequently the corresponding low-speed segment has been used; and a cached bit configured to indicate that the corresponding low-speed segment is mapped to one of the high-speed segments.

The mapping table part may include a plurality of mapping items, the number of which is equal to the number of the high-speed segments; and each of the mapping items includes a cached low-speed segment address.

The log area is divided into a plurality of sectors; and each of the sectors comprises: a meta-version configured to include information about a version of metadata; a hash used to check whether an error is present in data stored in the sector; a cache update item configured to include changed parts that are not yet applied to the last mapping table part of the nonvolatile storage device; and an item number configured to indicate the number of cache update items in a sector.

In accordance with another aspect of the present invention, there is provided a read/write cache method persistent in the event of a power failure, comprising: prohibiting from changing all of the RF values; comparing the number of the hot segments with the number of high-speed segments; setting a start value of a cache clock to zero if, as a result of the comparison, the number of hot segments is equal to or lower than the number of high-speed segments; comparing the number of the cache clock with the number of low-speed segments; checking whether a low-speed segment pointed to by the cache clock is an uncached hot segment if, as a result of the comparison, the number of cache clocks is equal to or lower than the number of low-speed segments; moving the eviction clock to a next high-speed segment that caches a cached cold segment if, as a result of the checking, the-speed segment pointed to by the cache clock is an uncached hot segment; evicting the cached cold segment from the high-speed segment pointed to by the moved eviction clock; appending a cache update item, which includes the current value of the eviction clock as the high-speed segment address and the current cache clock value as the low-speed segment address, to the log area; and caching the low-speed segment, pointed to by the cache clock, in the high-speed segment pointed to by the eviction clock.

The read/write cache method may further include, after comparing the number of hot segments with the number of high-speed segments: multiplying all the RF values of the main memory by a decay constant if, as a result of the comparison, the number of hot segments exceeds the number of high-speed segments; and storing the results of the multiplication as RF values.

The read/write cache method may further include, after comparing the cache clock with the number of low-speed segments, releasing the prohibition from changing ail the RF values of the main memory if, as a result of the comparison, the cache clock exceeds the number of low-speed segments.

The read/write cache method may further include, after checking whether the low-speed segment pointed to by the cache clock is an uncached hot segment, increasing the cache clock by one if, as a result of the checking, the low-speed segment pointed to by the cache clock is an uncached hot segment.

Evicting the data, stored in the high-speed segment pointed to by the moved eviction clock, from the high-speed storage device may include clearing the cached bit of the evicted low-speed segment to zero, and deleting the mapping information for the evicted low-speed segment from the low-speed/high-speed mapping tree.

Caching the low-speed segment, pointed to by the cache clock, in the high-speed segment pointed to by the eviction clock may include assigning the value of the cache clock to the mapping item pointed to by the eviction clock, setting the cached bit of the low-speed segment pointed to by the cache clock to one; copying the data of the low-speed segment, pointed to by the cache clock, to the high-speed segment 201 pointed to by the eviction clock; and to the low-speed/high-speed mapping tree, adding a mapping information that the high-speed segment pointed to by the eviction clock caches the low-speed segment, pointed to by the cache clock.

In accordance with still another aspect of the present invention, there is provided a read/write cache method persistent in the event of a power failure, including: copying the main metadata with the latest version between the two metadata regions to the main metadata of the main memory; to the low-speed/high-speed mapping tree 440, adding a mapping information that m-th high-speed segment caches n-th low-speed segment, for each m-th mapping items of the mapping table part of the main memory, where n is a low-speed segment number, that is stored in the m-th mapping item; to the main metadata of the main memory, adding a metadata information indicating that i-th high-speed segment caches j-th low-speed segment, where i and j are the high-speed segment address the low-speed segment address, respectively that are stored in each cached update item of the log area; and increasing the version 412 of the meta-information part by one, and storing the main metadata of the main memory in the alternate metadata region.

Adding the metadata information to the low-speed/high-speed mapping tree, comprises removing mapping information, pointed to by the last cache update item, from the metadata of the main memory.

Adding the metadata information to the main metadata of the main memory and the low-speed/high-speed mapping tree may include, for each mapping item that includes a pair of a high-speed segment-address, i, and a low-speed segment address, j, letting the obsolete slow-speed segment address, k, be the value in the i-th mapping item; clearing the cached bit of the k-th slow-speed segment to zero; assigning j to the i-th mapping item; setting the cached bit of the j-th RF item to one; and inserting a mapping information, that the i-th high-speed segment caches the j-th low speed segment, to the low-speed/high-speed mapping tree.

BRIEF DESCRIPTION OF THE DRAWINGS

The above and other objects, features and advantages of the present invention will be more clearly understood from the following detailed description taken in conjunction with the accompanying drawings, in which.

DETAILED DESCRIPTION

Embodiments of the present invention are described with reference to the accompanying drawings. In the following description of the present invention, detailed descriptions of known functions and configurations that are deemed to make the gist of the present invention obscure will be omitted.

Figure 1:
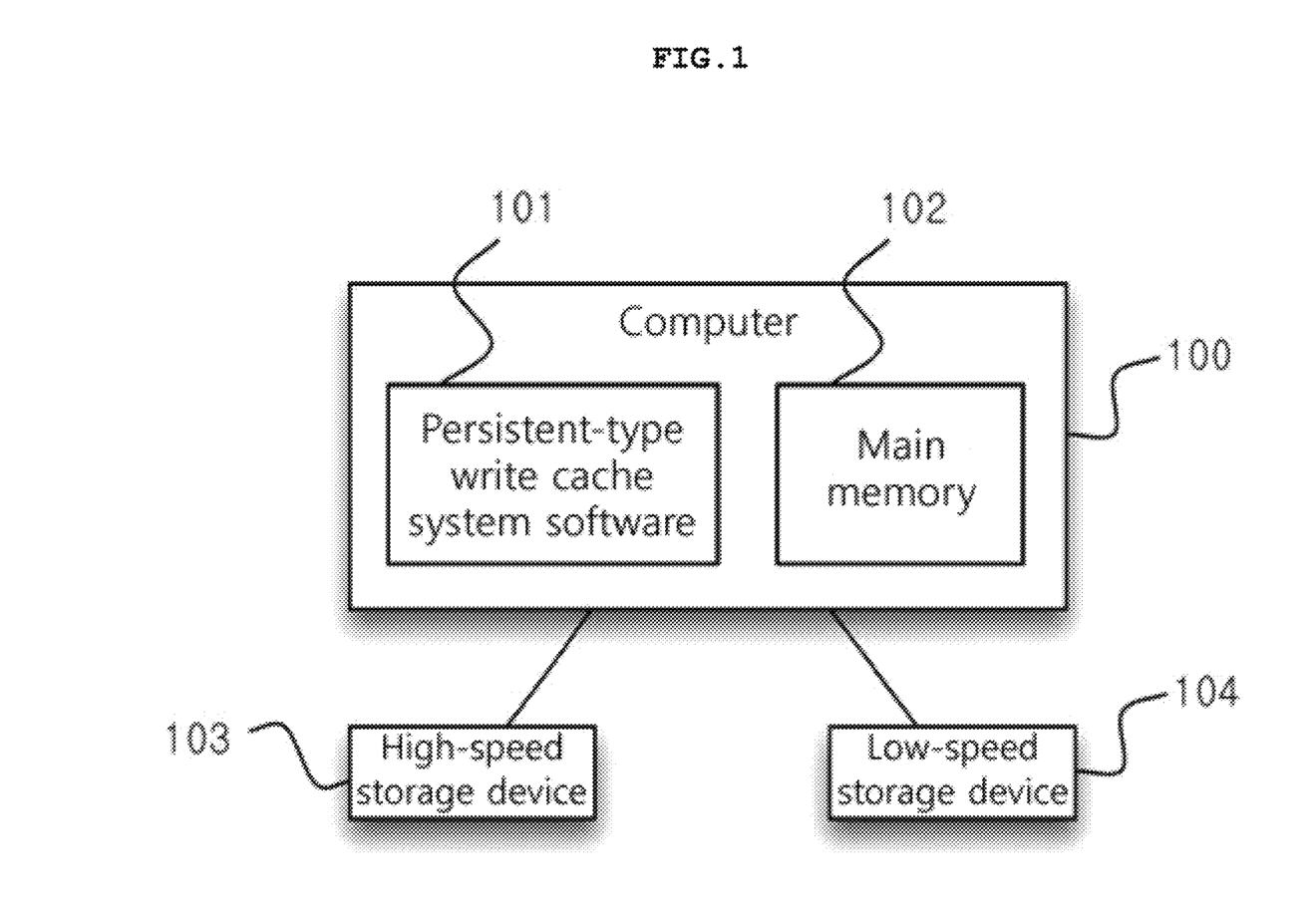
FIG. 1 is a block diagram illustrating the schematic configuration of a computer storage system according to an embodiment of the present invention.

FIG. 1 is a block diagram illustrating the schematic configuration of a computer storage system according to an embodiment of the present invention.

FIG. 1 illustrates the architecture of a system in which a read/write cache device and method make data and metadata persistent in the event of a power failure according to embodiments of the present invention may be implemented. The present invention is applied to the system software 101 of a computer 100. The computer 100 includes a high-speed storage device 103, a low-speed storage device 104, and main memory 102.

The high-speed storage device 103 is a nonvolatile storage device that persistently retains data even after a power failure, h single flash-based SSD or a redundant array of independent disks (RAID) including SSDs may be used as the high-speed storage device 103.

The low-speed storage device 104 is a storage device that has lower performance than the high-speed storage device 103 and that is inexpensive. A single HDD or an RAID including HDDs may be used as the low-speed storage device 104.

In general, although ail data has been stored in the low-speed storage device 104, a frequently used storage space is cached in the high-speed storage device 103. The storage space is managed in the form of segments that consist of multiple sectors. The greater the segment size, the higher gain of spatial locality can be achieved.

Figure 2:
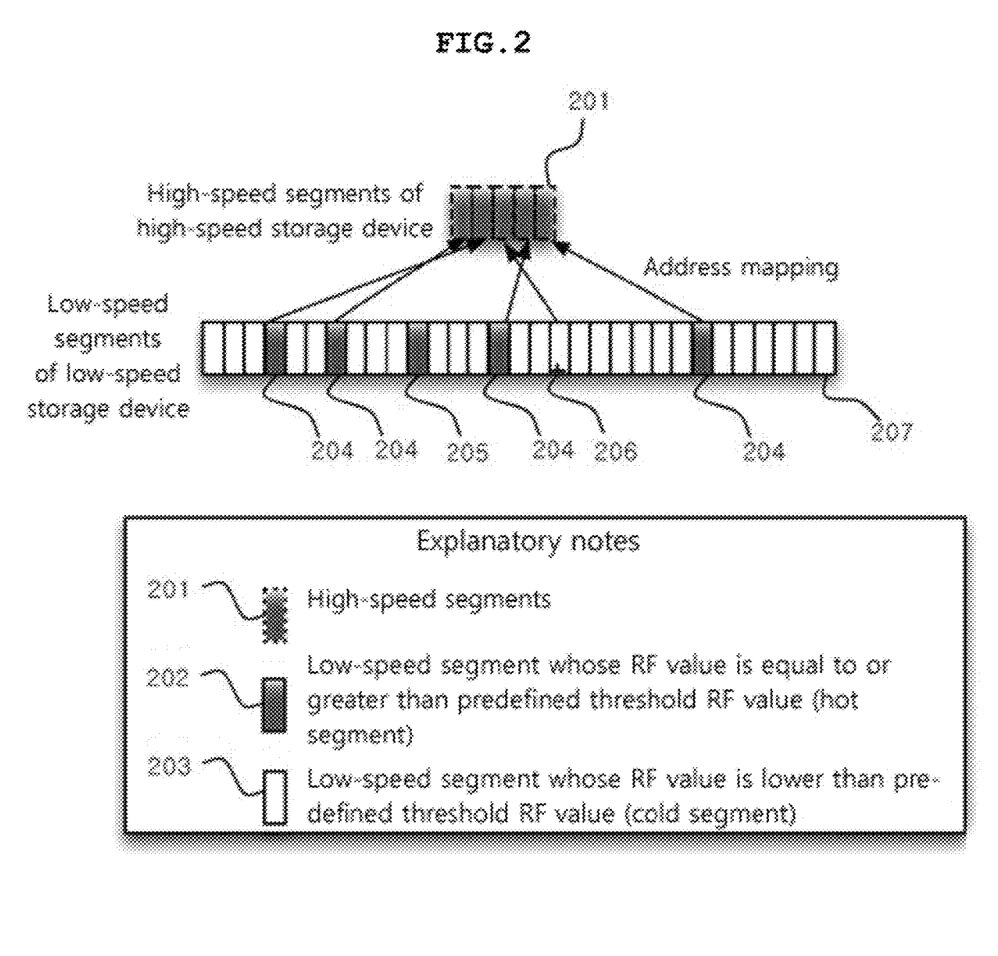
FIG. 2 is a block diagram illustrating the address mapping of a logical storage space, a high-speed storage device and a low-speed storage device that are viewed by a user according to an embodiment of the present invention.

FIG. 2 is a block diagram illustrating the address mapping of a logical storage space, a high-speed storage device and a low-speed storage device that are viewed by a user according to an embodiment of the present invention.

Referring to FIG. 2, in an embodiment of the present invention, the high-speed storage device 103 includes high-speed segments 201, and the low-speed storage device 104 includes low-speed segments 202 to 207. The low-speed storage device 104 provides a service for a read/write request to a segment that is not frequently used (hereinafter referred to as a cold segment) 203. A segment that is frequently used, i.e., a segment, whose recency/frequency value (hereinafter referred to as an RF value) 422 is equal to or greater than a predefined threshold RF value (hereinafter referred to as a hot segment) 202, is classified as a hot segment and can be cached to the high-speed segment 201. That is, a read/write request that is delivered to a cached hot segment 204 is redirected to the high-speed segment 201 whose address has been mapped to this hot segment (hereinafter referred to as "cached").

The hot segment 202 can be a cached hot segment 204 or an uncached hot segment 205. A segment, whose RF value 422 is less than the predefined threshold RF value, is classified as a cold segment. The cold segment 203 can foe a cached cold segment 206 or an uncached cold segment 207.

The hot segment 202 may be changed into the cold segment 203 or the cold segment 203 may be changed into the hot segment 202 because the RF value 422 of each of the low-speed segments 202 to 207 changes in real time depending on how frequently each of the low-speed segments 202 to 207 is accessed. Accordingly, a cached hot segment 204 may be changed into a cached cold segment 206, or an uncached cold segment 207 may be changed into an uncached hot segment 205. Therefore, an eviction and caching procedure evicts a cached cold segment 206 from the high-speed storage device 103 and caches an uncached hot segment 205 in the high-speed storage device 103.

The hot segment 202 is cached to one of the high-speed segments 201. Accordingly, the present invention manages address-mapping information indicating that the high-speed segments are mapped to which hot segments 202. Address-mapping information and information for cache management are called metadata 300 to 440.

Figure 4:
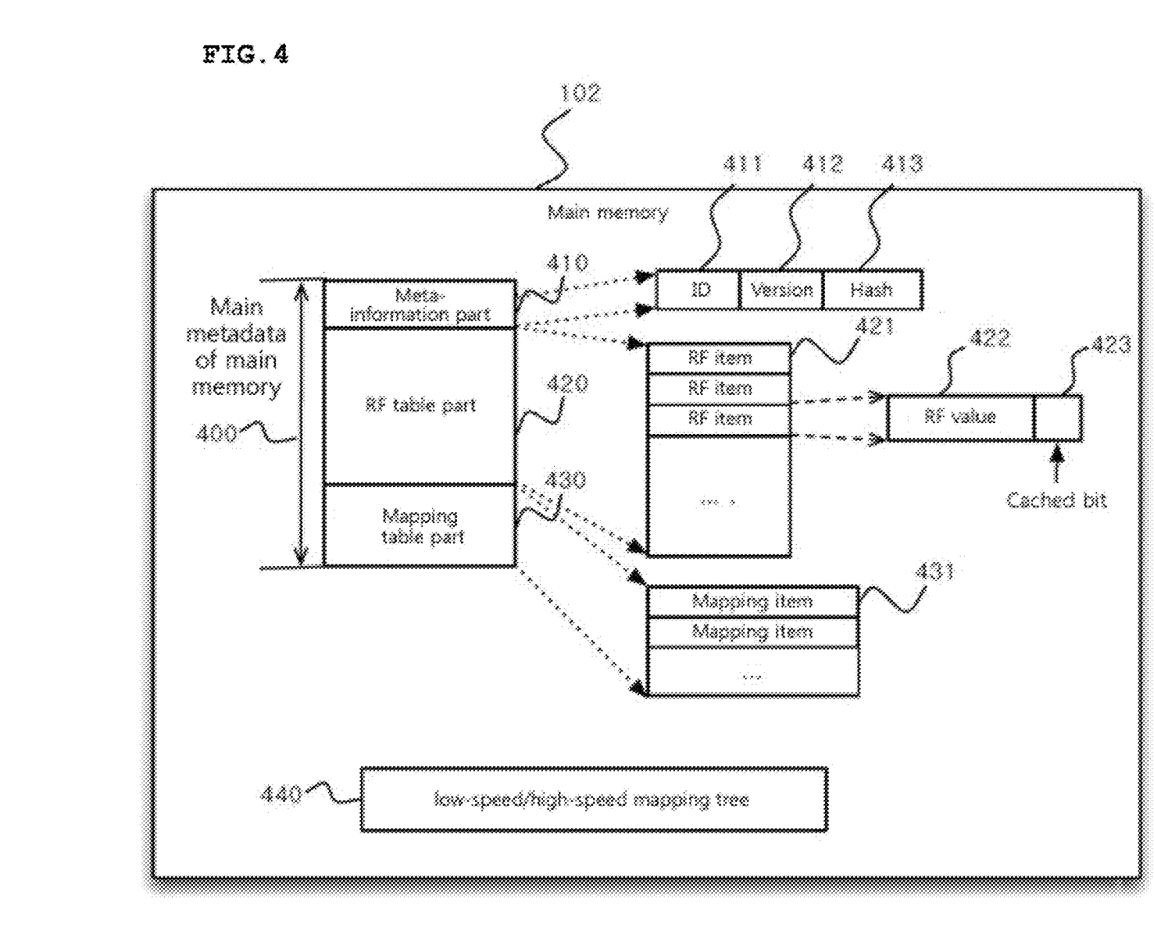
FIG. 4 is a diagram illustrating the structure of metadata stored in the main memory according to an embodiment of the present invention.

The present invention provides a high-speed/low-speed mapping tree 440 that indicates which high-speed segment 201 a given low-speed segment 202 to 207 is mapped to. In addition, there is provided an address-mapping table 330 or 430 that indicates which low-speed segment 204 or 206 each high-speed segment 201 caches.

The traditional cache policies have been developed for volatile memory. That is, a consistency problem does not occur because the traditional cache policies are not designed for a persistent cache. Accordingly, performance is significantly degraded if the traditional cache policies are applied to a persistent cache where consistency is provided. A persistent cache must store metadata in a nonvolatile storage device whenever cache metadata is modified. The amount of cache metadata is very large for a storage-class cache whose capacity is very large. Furthermore, in the worst case, performance is significantly degraded because cache metadata must be written to a nonvolatile storage whenever an I/O is requested. Accordingly, there is a need for a method that is different from the traditional cache policies.

The present invention employs a method that updates a cache after learning the frequencies of segments during a certain period of time, hence it avoids the overhead of a frequent update of cache metadata. The cache update interval may be 1 hours or a day. Alternatively, a cache update may occur during an idle period in which a user does not use this storage system.

Figure 3:
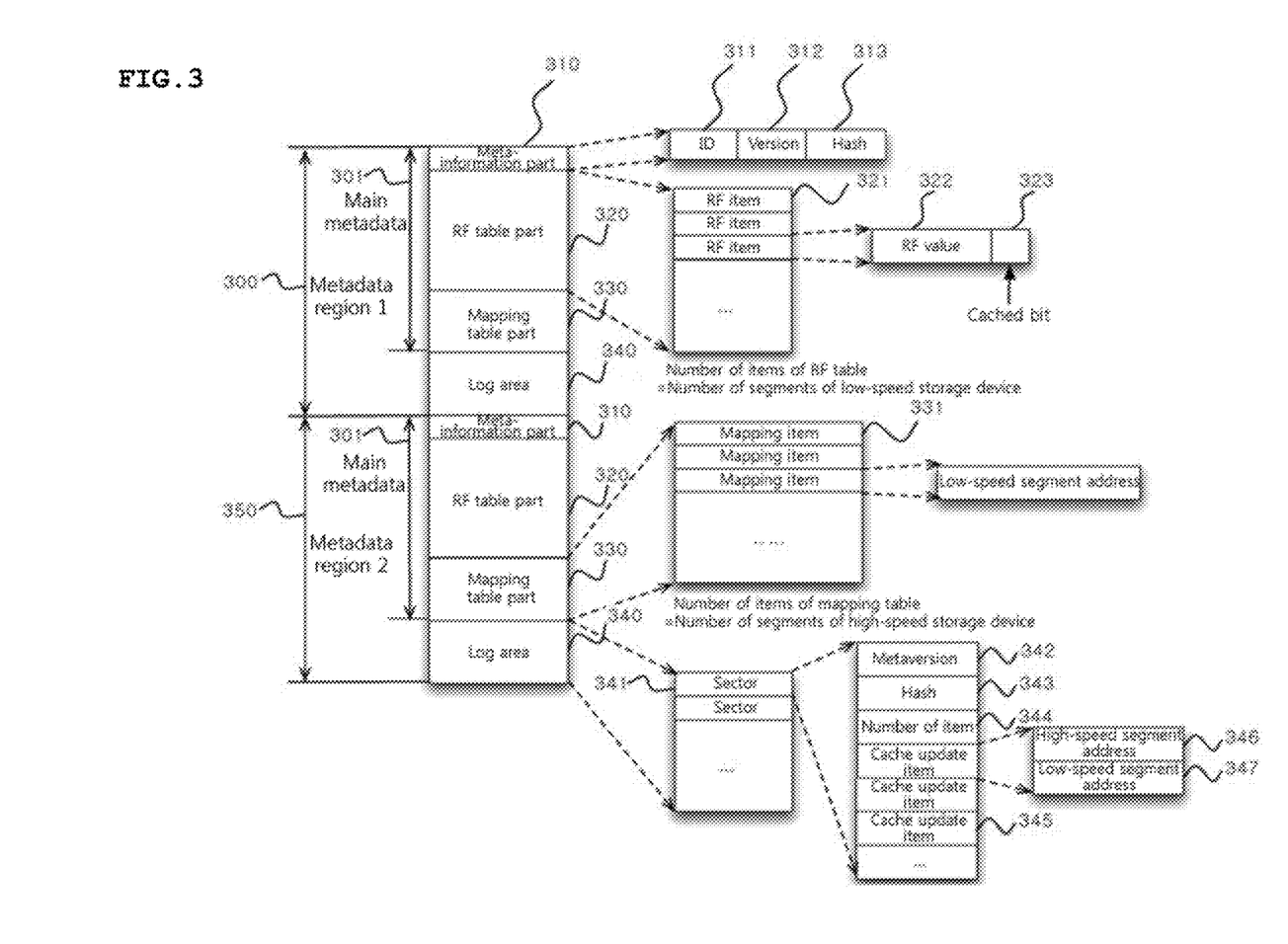
FIG. 3 is a diagram illustrating the structure of metadata stored in a nonvolatile storage device according to an embodiment of the present invention.

The structure of cache metadata stored in a nonvolatile storage device is illustrated in FIG. 3. The high-speed storage device 103, the low-speed storage device 104, or a third storage device may be used as the nonvolatile storage device depending on the design condition.

Referring to FIG. 3, main metadata 301 includes a meta-information part 310, a recency/frequency (RF) table part 320, a mapping table part 330, and a log area 340. The order of the meta-information part 310, RF table part 320, mapping table part 330 and log area 340 of the main metadata 301 may be changed.

The meta-information part 310 or 410 provides the integrity of the main metadata and the version of metadata stored in two metadata regions. The meta-information part 310 or 410 includes an ID 311 or 411, a version 312 or 412, and a hash 313 or 413.

The ID 311 or 411 stores ID information indicating whether the stored main metadata is valid.

The version 312 or 412 indicates one of the two metadata regions 300 and 350 in which the latest main metadata has been stored. In particular, the value of the version increases whenever the metadata is stored, and the main metadata is alternately stored in the metadata region1 300 and metadata region2 350 of the two metadata regions 300 and 350.

The hash 313 or 413 is used to check whether the main metadata has integrity when a system crashes while the main metadata 301 is being written.

A plurality of RF items 321 forming the RF table part 320 correspond to low-speed segments 202 to 207, respectively. Accordingly, the number of RF items 321 is equal to the number of all the low-speed segments 202 to 207.

Each of the RF items 321 includes an RF value 322 and a cached bit 323. The RF value 322 indicates whether a corresponding one of the low-speed segments 202 to 207 has been recently and frequently used. The cached bit 323 indicates whether a corresponding one of the low-speed, segments 202 to 207 has been mapped to, i.e., cached in, any one of the high-speed segments 201. In this case, if the cached bit 323 is 1, it means that a corresponding low-speed segment has been cached to any one of the high-speed segments 201.

The mapping table part 330 indicates which one of the low-speed segments 202 to 207 each of high-speed segments 201 caches. The number of items of the mapping table part 330 is equal to the number of high-speed segments 201, and each of the items includes the address of a cached low-speed segment 204 or 206.

A change in the mapping table part 330 is appended to the log area 340. Any change of the mapping table part 330 changes requires updating the main metadata 301, which causes a big overhead because the size of the mapping table part 330 stored in the nonvolatile storage device is large. Accordingly, if there is a change in the mapping table part 330, only the change is written to the log area 340 for each sector 341 using a journaling scheme without changing the mapping table 330.

Each of a plurality of the sectors 341 forming the log area 340 includes a meta-version 342, a hash 343, the number of items 344, and cache update items 345. The meta-version 342 needs to be the same as the version 312 of the main metadata 301. If the meta-version 342 is not the same as the version 312 of the main metadata 301, a corresponding sector 341 is treated as invalid. The hash 343 is used to check whether there is an error in data stored in a sector. The number of items 344 indicates the number of cache update items 345 in one sector.

The changed parts of the mapping table part 330 are written to a sector 341 of the log area and appended sequentially from the first sector 341, like a journaling scheme. One or more cache update items 345 can be included in one sector 341. Each of the cache update items 345 includes a high-speed segment address 346 and a low-speed segment address 347.

Each of the cache update items 345 indicates that there is a change that a corresponding high-speed segment address 346 caches the low-speed segment address 347 but a new mapping table 330 with the change is not recorded in the metadata regions 300 or 350.

The mapping information of all the cache update items 345 of the log area 340 can foe combined with the mapping table part 330.

The metadata region 1 300 and the metadata region 2 350 in which the main metadata 301 is stored are stored in the nonvolatile storage device 103 or 104. The main metadata 301 stored in the nonvolatile storage device 103 or 104 is not directly accessed, in real time because it takes longer to access the nonvolatile storage device 103 or 104 than the main memory 102.

The meta-information part 410, an RF table part 420, and a mapping table part 430 that are used in real time are located in the main memory 100. The meta-information part 410, the RF table part 420, and the mapping table part 430 that are located in the main memory 102 have the same structures as the meta-information 310, the RF table 320, and the mapping table 330 that are stored in the nonvolatile storage device 103 or 104.

The high-speed/low-speed mapping tree 440 is not stored in the nonvolatile storage device 103 or 104, but is present only in the main memory 102. If the RF table part 320 and the mapping table part 330 are stored in the nonvolatile storage device whenever they are changed, performance is highly degraded because the RF table part 320 and the mapping table part 330 include a large amount of data. Accordingly, the present invention employs a policy that minimizes the number of times that metadata is stored.

FIG. 4 illustrates the main metadata 400 and the low-speed/high-speed mapping tree 440 that is in the main memory.

Referring to FIG. 4, the low-speed/high-speed mapping tree 440 is used to check whether a given one of the low-speed segments 202 to 207 has been mapped or has not been mapped to a specific high-speed segment 201. In this case, a tree scheme consumes a smaller amount of memory than a table because most of the low-speed segments 205 and 207 have not been cached to the high-speed segments 201. Accordingly, the low-speed/high-speed mapping tree 440 may be implemented as a radix tree, an index tree, a red black tree, a B+tree, a hash table, or a binary tree. The low-speed/high-speed mapping tree 440 is not stored in the nonvolatile storage device 103 or 104 because it can be reconstructed from the mapping table part 430.

Each of the low-speed segments 202 to 207 has an RF value variable to take its recency and frequency into consideration.

The RF value of a segment increases by a predefined constant value (i.e., a RF increment) whenever a cache hit occurs in the segment. In order to prevent an excessive increase in the RF value, consecutive cache hits are considered to be a single hit.

If the RF value exceeds a predefined threshold value (a predefined threshold RF value), a corresponding one of the low-speed segments 202 to 207 is considered to be the hot segment 202. If the number of low-speed segments 202 to 207 that have been accessed at least once is smaller than the number of high-speed segments 201, the corresponding low-speed segments 202 to 207 are considered to be the hot segments 202.

For recency, a decay procedure is performed on all of the RF values 422 located in the main memory 102 whenever the number of hot segments 202 exceeds the cacheable number of segments (i.e., the number of high-speed segments 201). Accordingly, the decay procedure reduces the number of hot segments 202. In the decay procedure, all the RF values 422 decrease by multiplying all the RF values by a decay constant that is greater than 0 and smaller than 1. In this case, the RF value 422 has a low value if the corresponding low-speed segment 202 to 207 is not accessed recently for a long time even though its frequency was high in the past.

Whenever a read or write request occurs in a specific one of the low-speed, segments 202 to 207, the RF value of the specific low-speed segment is increased by a predefined RF increment value.

Accordingly, this cache policy takes recency and frequency into consideration.

A caching and eviction procedure may perform at any time by a user or periodically, but may be performed with the lowest priority. The period that the caching and evicting procedure performs can be several hours or a day. If the caching and eviction procedure is scheduled to perform while a user does not use the system, the user does not experience the caching and eviction overhead.

The hot segment 202 refers to a low-speed segment whose RF value is greater than a predefined threshold RF value. The hot segment 202 can become the cold segment 203 or the cold segment 203 can become the hot segment 202, depending on its RF value. In general, the hot segment 202 is cached to the high-speed segment 201, and the cold segment 203 is cached, to the high-speed segment 201.

There is a moment when a low-speed segment whose RF value is instantaneously equal to or greater than a predefined threshold RF value (i.e., the hot segment 202) has not been cached to a high-speed segment. In the present invention, such a segment is called "uncached hot segment 205". On the contrary, there is a moment when a cold segment has been cached to a high-speed segment. In the present invention, such a segment is called "cached cold segment".

When a caching and eviction procedure starts, the "uncached hot segments 205" are cached to the high-speed segment 201, and the "cached cold segments 206" are evicted from the high-speed storage device 103. When the caching and eviction procedure starts, the decay procedure is performed first so that the number of hot segments does not exceed the number of high-speed segments 201.

Figure 5:
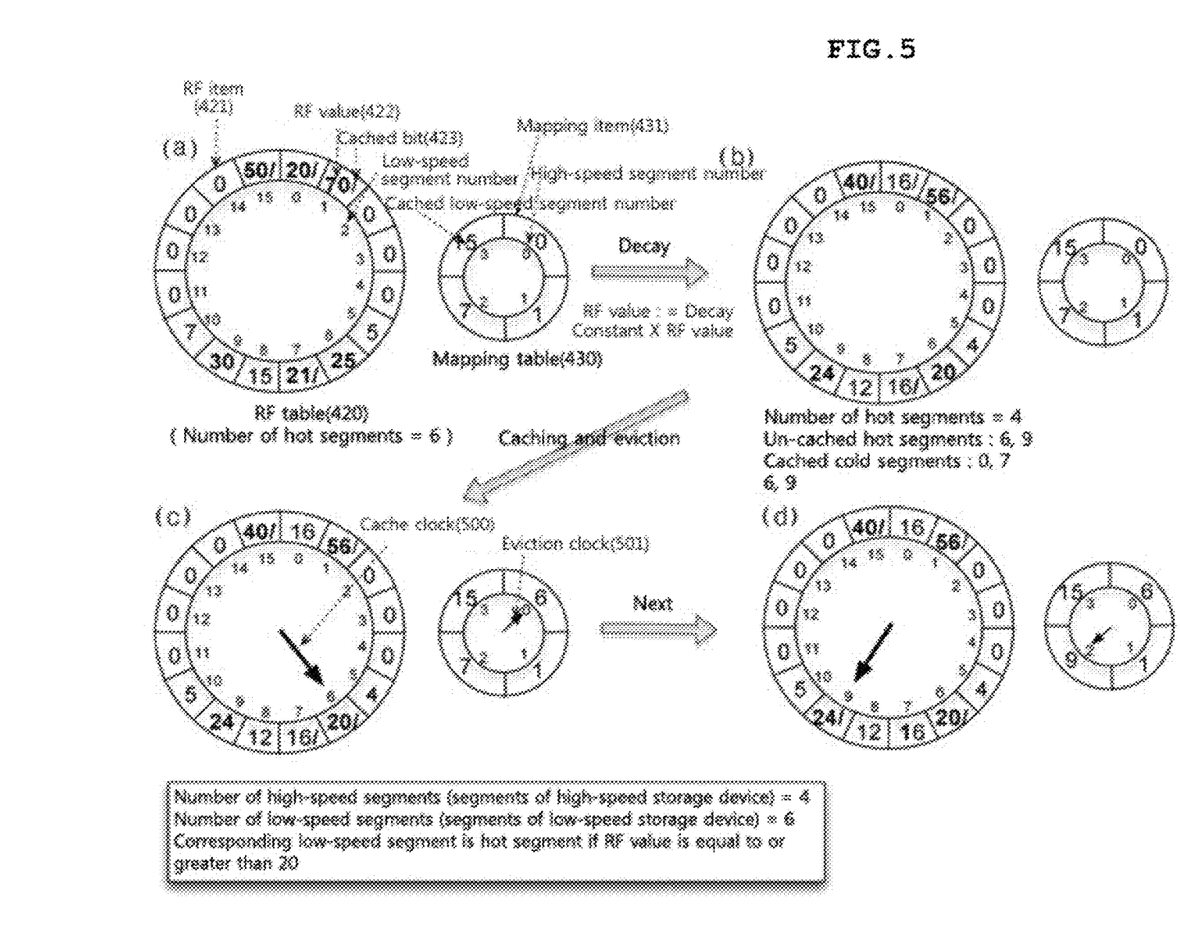
FIG. 5 is an exemplary diagram illustrating a caching and eviction procedure according to an embodiment of the present invention.

FIG. 5 is an exemplary diagram illustrating a caching and eviction procedure according to an embodiment of the present invention.

FIG. 5 illustrates an embodiment in which a decay procedure and a caching and eviction procedure are performed if the number of high-speed segments 201 is 4, the number of low-speed segments 202 and 203 is 16, and a predefined threshold RF value is 20.

The RF table part 420 and the mapping table part 430 may be represented in the form of circles in which the start and end of each of the RF table part 420 and the mapping table part 430 are connected to each other, as illustrated in FIG. 5.

The RF table 420 includes the RF value 422 of each of the low-speed segments 202 to 207, and the number of items of the RF table part 420 is the number of low-speed segments 202 to 207. The mapping items 331 of the mapping table part 430 stores the address of the low-speed segments 201 that the corresponding the high-speed segment 204 or 206 caches. The number of mapping items 331 is equal to the number of high-speed segments 201.

Referring to FIG. 5(a), a decay procedure is performed if the number of hot segments 202 whose RF value 422 is greater than a predefined threshold RF value is greater than the number of high-speed segments 201. In the decay procedure, each RF value 422 of the RF table 420 is set by multiplying the RF value 422 by a decay constant. The decay constant is 4/5 in FIG. 5. FIG. 5(b) illustrates the state of the RF table part 420 and the mapping table part 430 after the decay procedure has been performed in the embodiment of FIG. 5(a).

If the number of hot segments is equal to or smaller than the number of high-speed segments 201 as illustrated in FIG. 5(b), a caching and eviction procedure is performed. FIG. 5(c) illustrates the main metadata 400 after that No. 0 low-speed, segment 206 is evicted and No. 6 low-speed segment 205 is cached to No. 0 high-speed segment 201, as illustrated in FIG. 5(b).

A cache clock 500 operating in the RF table part 420 starts from 0 when a caching and eviction procedure starts, rotates clockwise, and stops at an "uncached hot segment 205". An eviction clock 501 rotates clockwise at the next location of the last location that the eviction clock 501 stopped at the previous step, and stops at a "cached cold segment 206". The cached cold segment 206 cached at a location (i.e., a high-speed segment) pointed to by the eviction clock 501 is evicted from the location. That is, the caching and eviction procedure moves data stored in the high-speed segment 201 pointed to by the eviction clock 501 to the low-speed segment 206, i.e., the original location of the data. The caching and eviction procedure deletes the caching information of the evicted low-speed segment 206 from the main metadata 400 of the main memory 102.

Thereafter, with regard to the value of the eviction clock 501 and the value of the cache clock 500, a new cache update item 345 including the eviction clock as high-speed segment address 346 and the cache clock as low-speed segment address 347 is stored (or logged) in the next sector of the last stored sector 341. If there is no sector 341 that is previously stored, the cache update item is stored in the first sector 341 of the log area 340.

The object of the logging task is to indicate that the high-speed segment 201 pointed to by the eviction clock 501 caches the low-speed segment 205, pointed to by the cache clock 500.

The log area 340 is in both the metadata region 1 300 and the metadata region 2 350. However, a valid log area 340 is in only one of the two metadata regions 300 and 350. That is, the last valid log area 340 is stored in the last valid metadata region 300 or 350 where the last valid main metadata 301 has been stored. If the main metadata 301 has recently been stored in the metadata region 1 300, the log area 340 of the metadata region 1 300 is valid. If the main metadata 301 has recently been not stored in the metadata region 1 300, the log area 340 of the metadata region 2 350 is valid.

After logging a sector 341 finishes, the low-speed segment 205 pointed to by the cache clock 500 is cached to the high-speed segment 201 pointed to by the eviction clock 501. That is, the data of the low-speed segment 205 pointed to by the cache clock 500 is copied to the high-speed segment 201 pointed to by the eviction clock 501, and the new caching information is added to the main metadata 400 of the main memory.

The aforementioned method is a process to evict a cached cold segment and to cache an uncached hot segment at the location from which the cached cold segment has been evicted. This process repeats while the cache clock 500 and the eviction clock 501 rotate in the same way. When the cache clock 500 makes one revolution, the caching and eviction procedure is completed.

Referring to FIG. 5(*c*), No. 0 low-speed segment 205 that cached in No. 0 high-speed segment 201 pointed to by the eviction clock 501 is evicted. A new cache update item that includes the value 0 of the eviction clock 501 as the high-speed segment address 346 and the value 6 of the cache clock 500 as the low-speed segment address 347 is logged in a subsequent sector 341. No. 6 low-speed segment 203 pointed to by the cache clock 500 is cached to No. 0 high-speed segment 201 pointed to by the eviction clock 501.

The cache clock 500 continues to rotate and stop at the next "uncached hot segment" 205. Referring to FIG. 5(*d*), the cache clock 500 stops at 9, and the eviction clock 501 stops at 2. No. 7 low-speed segment 206 is evicted from a No. 2 high-speed segment 201 pointed to by the eviction clock 501. A new cache update item that includes the value 2 of the eviction clock 501 as the high-speed segment address 346 and the value 9 of the cache clock 500 as the low-speed segment address 347 is logged in the next sector 341. No. 9 low-speed segment 205 pointed to by the cache clock 500 is cached to the No. 2 high-speed segment 201.

When the cache clock 500 makes one revolution around the RF table part 420 by repeating the aforementioned process, the version 412 of the main metadata 400 of the main memory 102 increases and the main metadata 400 is stored in the alternate metadata region 300 or 350 of the nonvolatile storage device 103 or 104, thereby terminating the caching and eviction procedure. If the location where the latest main metadata 400 of the main memory 102 was stored is the metadata region 1 300, the main metadata 400 is subsequently stored in the metadata region 2 350 at the next time. If the location where the latest main metadata 400 of the main memory was stored is not the metadata region 1 300, the main metadata 400 is stored in the metadata region 1 300 at the next-time. That is, the metadata 400 of the main memory 102 is alternately stored in the two metadata regions 300 and 350.

A change in the main metadata 301 of the nonvolatile storage device 103 or 104 occurring in the caching and eviction procedure is logged, in the region of the log area 340. In order to reduce logging overhead, a plurality of the cache update items 345 may be combined and stored as a single sector 341.

The meta-version 342 of each sector 341 must be equal to the version 312 of the latest main metadata 301 that has recently been stored. A sector 341 whose meta-version 342 is not equal to the version 312 of the latest main metadata 301 is invalid and discarded.

The valid sectors 341 are stored in one of the metadata region 300 or 350 where the latest main metadata 301 was stored. After the caching and eviction procedure completes, the main metadata 400 of the main memory 102 is more recent than the main metadata 301 stored in the non-volatile storage device. Accordingly, right after the caching and eviction procedure has been completed, the main metadata 400 of the main memory 102 is stored in an alternate main metadata 301 that is located in the non-volatile storage device 108 or 104.

If a power fails or the system crashes during the caching and eviction procedure, the main metadata 400 of the main memory 102 may be reconstructed by combining the latest main metadata 301, stored in the non-volatile storage device 103 or 104, with the cache update item 345 of the valid sector 341 of the log 340 in the metadata region 300 or 350.

Each of the cache update items 345 indicates that the low-speed segment address 347 is mapped to the high-speed segment address 346.

When a system restarts after an abnormal shutdown, the main metadata 400 of the main memory 102 is reconstructed by combining the main metadata 301, stored in the non-volatile storage device 103 or 104, with the cache update items 345 of the log 340. The low-speed/high-speed mapping tree 440 is generated from the mapping table part 430 of the main memory 102.

The cache update content of the last stored cache update item 345 is treated as invalid because the system cannot whether a cache update for the last stored cache update item 345 has been successful.

Figure 6:
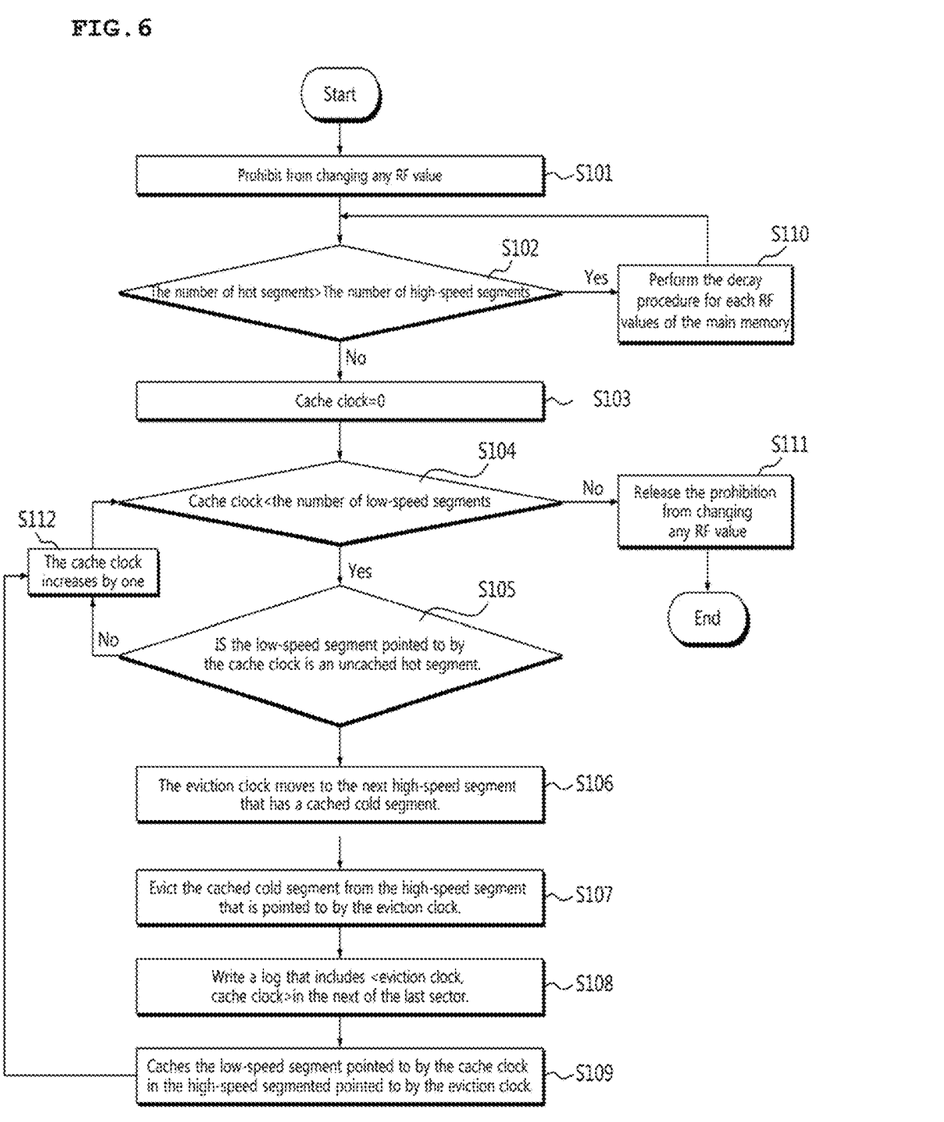
FIG. 6 is a flowchart illustrating a method of evicting data from a cache and moving data into the cache according to an embodiment of the present invention.

FIG. 6 is a flowchart illustrating a method of evicting data from a cache and moving data into the cache according to an embodiment of the present invention.

Referring to FIG. 6, a caching and eviction procedure may be performed at a specific point of time or periodically. When the caching and eviction procedure starts, changing the RF value 422 of the main memory 102 is prohibited so that hot segments (i.e., low-speed segments whose RF value is equal to or greater than a predefined threshold RF value) are not changed at first step S101.

In the caching and eviction procedure, a cached cold segment 206 is evicted from the cache (i.e., high-speed storage device) 103, and a hot segment 205 that has not been cached is cached to the cache 103.

Thereafter, if the number of hot segments 202 exceeds the number of high-speed segments 201 at second step S102, tenth step S110 of multiplying all the RF values 422 of the main memory 102 by a decay constant and storing the results of the multiplication as the RF value 422 is performed. Since the decay constant is greater than 0 and smaller than 1, all the RF values 422 are reduced at a specific ratio according to a decay procedure. Thereafter, second step S102 is performed again.

If the number of hot segments 202 does not exceed the number of high-speed segments 201 at second step S102, a actual caching and eviction is performed from third step S103. When the caching and eviction procedure first starts, the cache clock 500 starts at zero at third step S103. At subsequent fourth step S104, whether the cache clock 500 is smaller than the number of low-speed segments 202 and 203 is checked at fourth step S104. The maximum value of the cache clock 500 is the number of low-speed segments 202 and 203. Fifth step S105 of checking whether the low-speed segments 202 to 207 pointed to by the cache clock 500 is an uncached hot segment 202 is performed. If the result of the checking at fifth step S105 is false, twelfth step S112 that increases the cache clock 500 by one is performed, and fourth step S104 is performed. If the result of the checking at fifth step S105 is true, sixth step S106 of moving the eviction clock 501 to the next high-speed segment that has a cached cold segment is performed. In an embodiment of sixth step S106, the following may be performed. The eviction clock 501 increases by one, and stops at a cached cold segment 206.

Thereafter, seventh step S107 of evicting the cached cold segment from the high-speed segment 201 pointed to by the eviction clock 501 is performed. A detailed embodiment of seventh step S107 may be as follows. The value of the cache clock 500 is assigned to the mapping item 431 pointed to by the eviction clock of the mapping table part 330, the cached bit of the evicted low-speed segment is clear to zero. The data of the low-speed segment 205 pointed to by the cache clock 500 is copied to the high-speed segment 201 pointed by the eviction clock 501, and a mapping information that the high-speed segment 201 caches the low-speed segment 205 is added to the low-speed/high-speed mapping tree 440.

Eighth step S103 of appending the cache update item 345 including the current value of the eviction clock 501 as the high-speed segment address 346 and the current value of the cache clock 501 as the low-speed segment address 347 to the log area 340 is performed. The metadata region 300 or 350 of the log area 340 used at eighth step S108 is identical to that in which the main metadata 301 was recently stored.

Thereafter, ninth step S109 of caching the low-speed segment 202 or 203, pointed to by the cache clock 500, in the high-speed segment 201 pointed to by the eviction clock 501 is performed. A detailed embodiment of the ninth step is as follows. The value of the cache clock 500 is assigned to the mapping item 431 pointed to by the eviction clock of the mapping table 430 of the main memory 102. The cached bit 423 of the low-speed segment 202 or 203 pointed to by the cache clock 500 is set to one. The data of the low-speed segment 205, pointed to by the cache clock 500, is copied to the high-speed segment 201 pointed to by the eviction clock 501. A mapping information that the high-speed segment 201 pointed to by the eviction clock 501 caches the low-speed segment 202 or 203, pointed to by the cache clock 500, is added to the low-speed/high-speed mapping tree 440.

After the ninth step completes, the twelfth step is performed and then the fourth step is performed. If the result of the checking at the fourth step is false, eleventh step S111 of releasing the prohibition from changing any RF value is performed, and the caching and eviction procedure is terminated.

Figure 7:
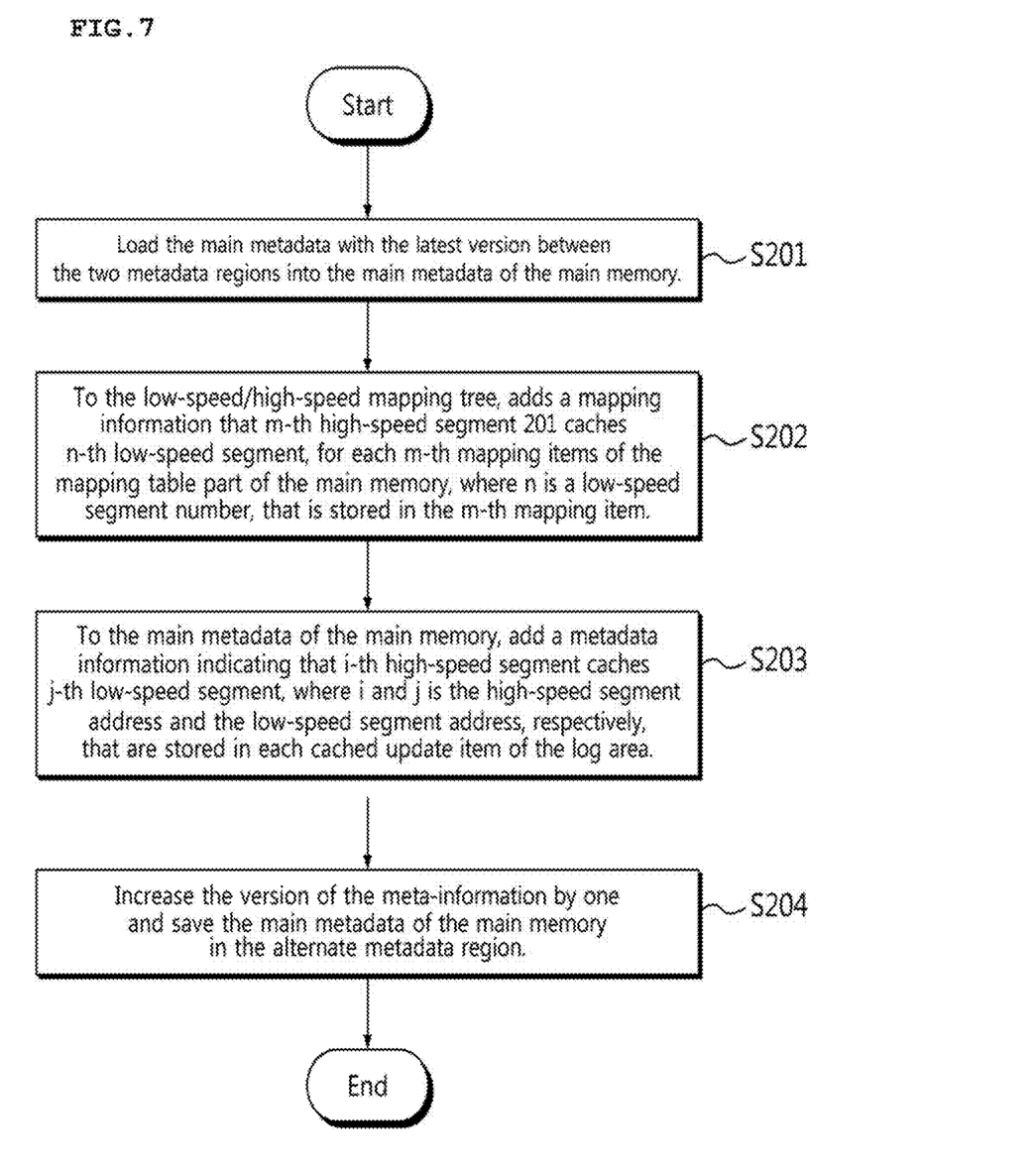
FIG. 7 is a flowchart illustrating a method of restoring cache metadata when a system restarts according to an embodiment of the present invention.

FIG. 7 is a flowchart illustrating a method of recovering cache metadata when a system restarts according to an embodiment of the present invention.

When a system restarts after a normal or abnormal termination of the system, the main metadata 400 of the main memory 102 is recovered, as illustrated in FIG. 7. That is, cache information is recovered.

After the restart of the system, at first step S201, the main metadata 301 with the latest version 312 between the metadata region 1 300 and metadata region 2 350 of the low-speed storage device 104 is copied to the main metadata 400 of the main memory 102.

Thereafter, the recovery process performs second step S202, which, to the low-speed/high-speed mapping tree 440, adds a mapping information that m-th high-speed segment 201 caches n-th low-speed segment 202 to 207, for each m-th mapping items 431 of the mapping table part 430 of the main memory 102, where n is a low-speed segment number, that is stored in the m-th mapping item 331. Thereafter, at third step S203, to the main metadata 400 of the main memory 102, this procedure adds a metadata information indicating that i-th high-speed segment caches j-th low-speed segment with i as the high-speed segment address 346 and j as the low-speed, segment address 347 that is stored in each cached update item 345 of the log area 340.

Thereafter, at fourth step S204, the version 412 of the meta-information part 410 increases by one, and the main metadata 400 of the main memory 102 is stored in the alternate metadata region 300 or 350.

A detailed embodiment of the third step in the system restart procedure is as follows. For each mapping item 345 that includes a pair of a high-speed segment address 346, i, and a low-speed segment address 347, j, this procedure lets the obsolete slow-speed segment address, k, be the value in the i-th mapping item 431, clears the cached bit of the k-th slow-speed segment 203 to zero, assigns j to the i-th mapping item 431, sets the cached bit of the j-th RF item 421 to one, and inserts a mapping information, that the i-th high-speed segment 201 caches the j-th low speed segment 202 to 207, to the low-speed/high-speed mapping tree 440.

As described above, the present invention has an advantage in that damage to cached data can be prevented when an emergency situation, such as a power failure, occurs.

Furthermore, the present invention has an advantage in that it can rapidly provide a read/write request for frequently used data because the frequently used data is redirected to the read/write cache in the high-speed storage device.

Moreover, the present invention provides a fully persistent-read/write cache, which improves both read and write performance, does not require any special primitive, has a low overhead, guarantees the integrity of the cache metadata and the consistency of the cached data, even during a crash or power failure, and is able to recover the flash cache quickly without any data loss.

Although the specific embodiments of the present invention have been disclosed for illustrative purposes, those skilled in the art will appreciate that various modifications, additions and substitutions are possible without departing from the scope and spirit of the invention as disclosed in the accompanying claims.

What is claimed is:

1. A read/write cache device persistent in an event of a power failure, comprising:
   a meta-information part configured to provide information about whether metadata has integrity and information about a version of metadata stored in two metadata regions;
   a recency/frequency (RF) table part configured to provide an RF value for each low-speed segment to determine the low-speed segment is recently and frequently accessed;
   a mapping table part configured to provide which low-speed segment each high-speed segment caches; and
   a log area configured to provide caching information that is not applied to the mapping table part.

2. The read/write cache device of claim 1, wherein the meta-information part comprises:
   an ID configured such that ID information indicating whether metadata stored in the metadata region is valid;
   a version configured to indicate one of the two metadata regions in which latest metadata has been stored; and
   a hash used to check whether metadata has integrity if the read/write cache device is incompletely stopped while the metadata is being stored.

3. The read/write cache device of claim 1, wherein the RF table part comprises a number of RF items that are equal to a number of the low-speed segments.

4. The read/write cache device of claim 3, wherein each of the RF items comprises:
   the RF value configured to indicate how recently and frequently a corresponding low-speed segment has been used; and a cached bit configured to indicate that the corresponding low-speed segment is mapped to one of high-speed segments.

5. The read/write cache device of claim 1, wherein:
the mapping table part comprises a plurality of mapping items, a number of which is equal to a number of the high-speed segments; and
each of the mapping items includes a cached low-speed segment address.

6. The read/write cache device of claim 1, wherein:
the log area is divided into a plurality of sectors; and
each of the sectors comprises:
a meta-version configured to include information about a version of metadata;
a hash used to check whether an error is present in data stored in a sector;
a cache update item configured to include changed parts that are not yet applied to the last mapping table part of the nonvolatile storage device; and
an item number configured to indicate a number of cache update items in a sector.

7. A read/write cache method persistent in an event of a power failure, comprising:
prohibiting from changing all of RF values;
comparing a number of hot segments with a number of high-speed segments;
setting a start value of a cache clock to zero if, as a result of the comparison, the number of hot segments is equal to or lower than the number of high-speed segments;
comparing a number of the cache clock with a number of low-speed segments;
checking whether a low-speed segment pointed to by the cache clock is an uncached hot segment if, as a result of the comparison, a number of cache clocks is equal to or lower than the number of low-speed segments;
moving an eviction clock to a next high-speed segment that caches a cached cold segment if, as a result of the checking, the low-speed segment pointed to by the cache clock is the uncached hot segment;
evicting a data, stored in a high-speed segment pointed to by the eviction clock moved to the next high-speed segment, from a high-speed storage device;
appending a cache update item, which includes a current value of the eviction clock as a high-speed segment address and a current cache clock value as a low-speed segment address, to a log area; and
caching the low-speed segment, pointed to by the cache clock, in the high-speed segment pointed to by the eviction clock.

8. The read/write cache method of claim 7, further comprising, after the comparing a number of hot segments with a number of high-speed segments:
multiplying all of the RF values of a main memory by a decay constant if, as a result of the comparison, the number of hot segments exceeds the number of high-speed segments; and
storing results of the multiplication as RF values.

9. The read/write cache method of claim 7, further comprising, after the comparing a cache clock with a number of low-speed segments, releasing the prohibition from changing all of the RF values of a main memory if, as a result of the comparison, the cache clock exceeds the number of low-speed segments.

10. The read/write cache method of claim 7, further comprising, after the checking whether a low-speed segment pointed to by the cache clock is an uncached hot segment, increasing the cache clock by one if, as a result of the checking, the low-speed segment pointed to by the cache clock is the uncached hot segment.

11. The read/write cache method of claim 7, wherein the evicting a data comprises:
clearing a cached bit of an evicted low-speed segment to zero, and deleting a mapping information for the evicted low-speed segment from a low-speed/high-speed mapping tree.

12. The read/write cache method of claim 7, wherein the caching the low-speed segment comprises:
assigning a value of the cache clock to a mapping item pointed to by the eviction clock, setting a cached bit of the low-speed segment pointed to by the cache clock to one;
copying data of the low-speed segment, pointed to by the cache clock, to the high-speed segment pointed to by the eviction clock; and
to a low-speed/high-speed mapping tree, adding a mapping information that the high-speed segment pointed to by the eviction clock caches the low-speed segment, pointed to by the cache clock.

13. A read/write cache method persistent in an event of a power failure, comprising:
copying a metadata with a latest version between two metadata regions to a metadata of a main memory;
to a low-speed/high-speed mapping tree, adding a mapping information that m-th high-speed segment caches n-th low-speed segment, for each m-th mapping items of a mapping table part of the main memory, where n is a low-speed segment number, that is stored in the m-th mapping item;
to the metadata of the main memory and the low-speed/high-speed mapping tree, adding a metadata information indicating that i-th high-speed segment caches j-th low-speed segment, where i and j are a high-speed segment address and a low-speed segment address, respectively that are stored in each cached update item of a log area; and
increasing a version of a metadata information part by one, and storing the metadata of the main memory in an alternate metadata region.

14. The read/write cache method of claim 13, wherein the adding a mapping information comprises removing mapping information, pointed to by a last cache update item, from the metadata of the main memory,
to a low-speed/high-speed mapping tree, adding a mapping information that m-th high-speed segment caches n-th low-speed segment.

15. The read/write cache method of claim 13, wherein the adding a metadata information comprises:
for each mapping item that includes a pair of a high-speed segment address, i, and a low-speed segment address, j,
letting an obsolete slow-speed segment address, k, be a value in an i-th mapping item;
clearing a cached bit of a k-th slow-speed segment to zero;
assigning j to the i-th mapping item;
setting a cached bit of a j-th RF item to one; and
inserting the mapping information, that the i-th high-speed segment caches the j-th low-speed segment, to the low-speed/high-speed mapping tree.

* * * * *